United States Patent [19]
Cannaliato

[11] Patent Number: 5,897,454
[45] Date of Patent: Apr. 27, 1999

[54] AUTOMATIC VARIABLE TRANSMISSION FOR POWER TOOL

[75] Inventor: Mike F. Cannaliato, Abingdon, Md.

[73] Assignee: Black & Decker Inc., Newark, Del.

[21] Appl. No.: 08/708,764

[22] Filed: Sep. 5, 1996

Related U.S. Application Data

[60] Provisional application No. 60/010,914, Jan. 31, 1996.

[51] Int. Cl.⁶ .............................. F16H 3/74; F16H 35/10
[52] U.S. Cl. ........................ 475/265; 475/266; 475/263
[58] Field of Search ................................ 475/254–266; 173/176, 13

[56] References Cited

U.S. PATENT DOCUMENTS

| | | |
|---|---|---|
| 3,610,343 | 10/1971 | Bratt . |
| 3,718,054 | 2/1973 | Perkins et al. ........................... 475/266 |
| 3,739,659 | 6/1973 | Workman, Jr. ....................... 475/265 X |
| 3,757,605 | 9/1973 | Morden .................................. 475/266 |
| 4,215,594 | 8/1980 | Workman, Jr. et al. ............ 475/266 X |
| 4,323,354 | 4/1982 | Blanchard . |
| 4,513,827 | 4/1985 | Dubiel . |
| 4,641,551 | 2/1987 | Pascaloff ................................. 475/263 |
| 4,650,007 | 3/1987 | Fujita et al. . |
| 4,834,192 | 5/1989 | Hansson ............................... 475/263 X |
| 4,869,131 | 9/1989 | Ohmori ................................ 475/266 X |
| 4,869,139 | 9/1989 | Gotman ............................... 475/263 X |
| 4,892,013 | 1/1990 | Satoh ...................................... 475/266 |
| 4,898,249 | 2/1990 | Ohmori ............................... 475/263 X |

FOREIGN PATENT DOCUMENTS

| | | |
|---|---|---|
| 0 302 229 A2 | 2/1989 | European Pat. Off. . |
| 0 329 852 A2 | 8/1989 | European Pat. Off. . |
| 0 404 035 A2 | 12/1990 | European Pat. Off. . |
| 37 20 633 A1 | 1/1988 | Germany . |
| WO 92/09406 | 6/1992 | WIPO . |

*Primary Examiner*—Khoi Q. Ta
*Attorney, Agent, or Firm*—Harness, Dickey & Pierce, P.L.C.

[57] ABSTRACT

An automatic transmission (30) for a power tool includes reduction gearing (42–58) coupled between a motor (24) and an output member (28). A mechanism for adjusting speed (60) of the output member (28) is coupled with the reduction gearing (42–58). The mechanism for adjusting speed (60) is slidably biased such that upon change in torque, the mechanism for adjusting speed (60) moves which, in turn, engages and disengages the reduction gearing (42–58) to vary the speed of the output member (28) between a first and second speed.

41 Claims, 13 Drawing Sheets

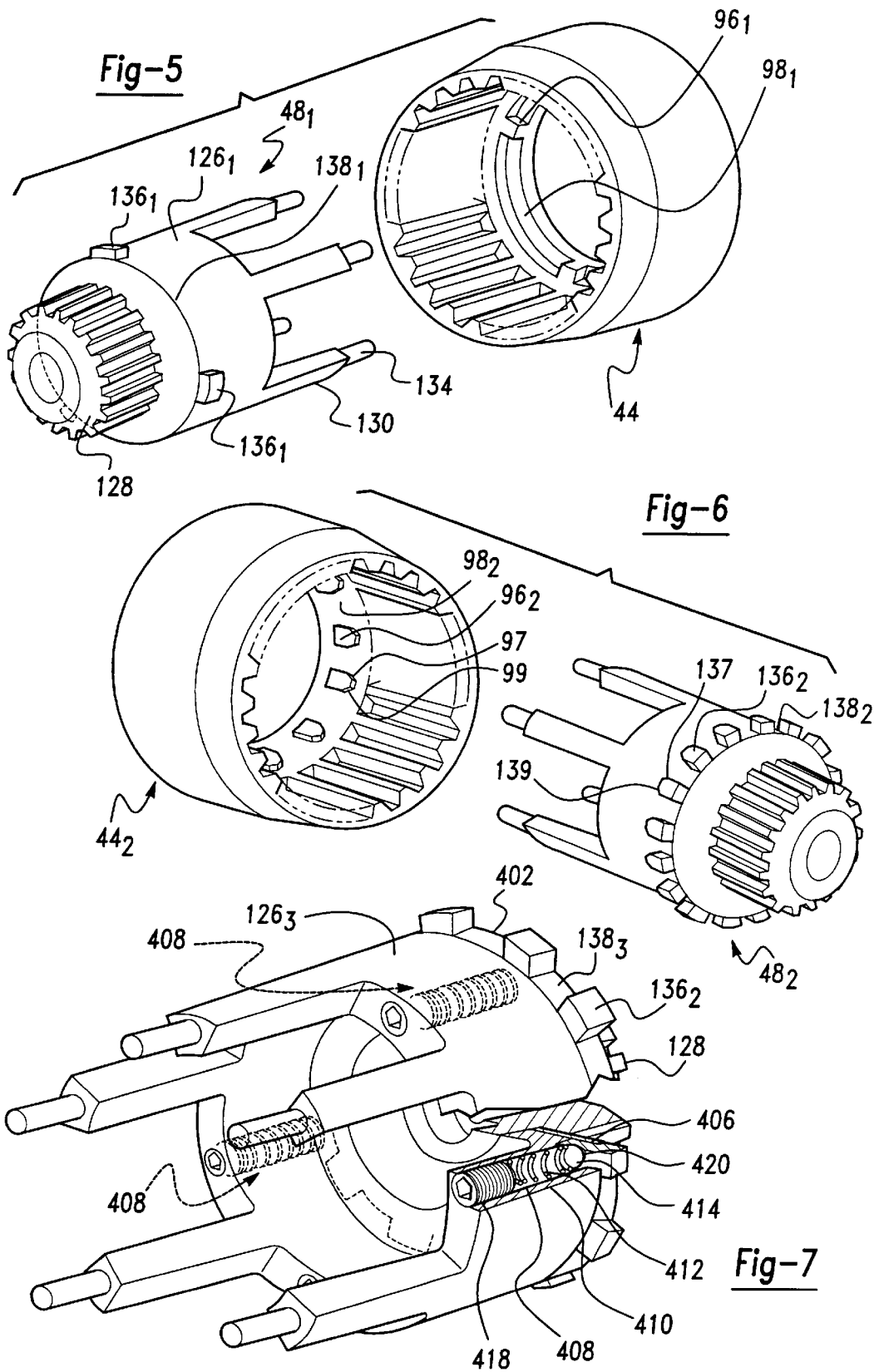

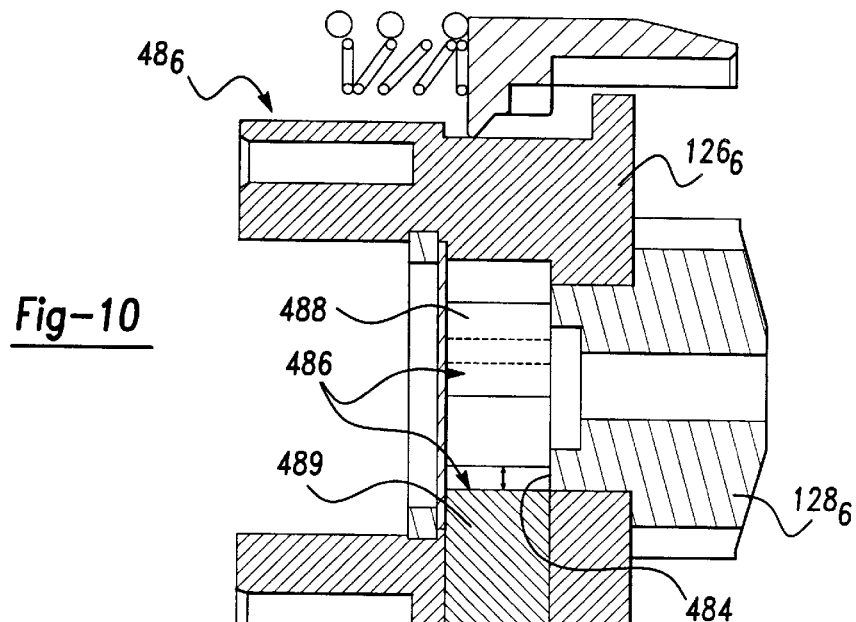
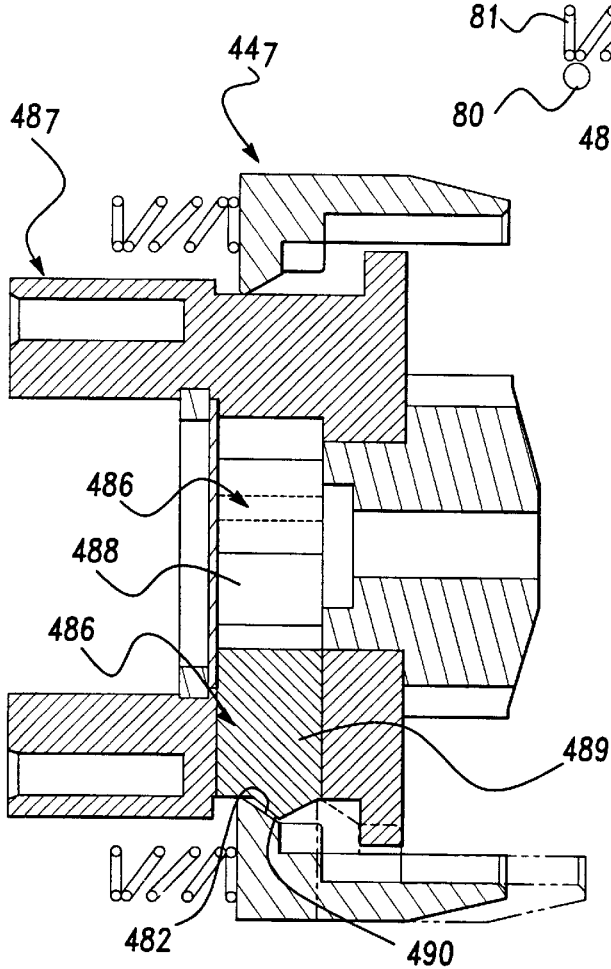
Fig-10
Fig-11

AUTOMATIC VARIABLE TRANSMISSION FOR POWER TOOL

CROSS-REFERENCE TO RELATED APPLICATION

This application is based upon and claims priority to U.S. Provisional Pat. App. Ser. No. 60/010,914 filed Jan. 31, 1996, and entitled Automatic Variable Transmission for Power Tool, the specification and drawings of which are herein expressly incorporated by reference.

FIELD OF THE INVENTION

The invention relates to power tools such as rotatable drills, power screwdrivers, and rotatable cutting devices. More particularly, the present invention relates to an automatic variable transmission to switch speed of an output shaft.

BACKGROUND OF THE INVENTION

In the consumer market, it would be desirable to have drills and power screwdrivers which have a variable speed transmission automatically changing the speed of the output spindle in response to torque. Variable two-speed drive is desirable so that during the insertion of a threaded fastener, the threaded fastener can rotate rapidly at the beginning of insertion into the part and towards the end of insertion, the transmission gears down moving it to a slower speed applying more torque onto the threaded fastener to shore-up the fastener upon full insertion of the fastener into the part. The variable transmission prevents motor burnout in the high speed mode as well as enabling the motor to work more efficiently. Of course, these designs are not unique to consumer devices, but are equally desirable for professional power tools.

SUMMARY OF THE INVENTION

Accordingly, it is an object of the present invention to provide a variable transmission for power tools embodying the foregoing design objectives.

In accordance with one aspect of the invention, an automatic transmission for a power tool comprises a transmission housing, a first reduction ring gear positioned in the housing, a first reduction gear carrier positioned in the housing, and a first set of reduction gears coupled with the first reduction ring gear, the first reduction gear carrier, and adapted to couple with a pinion gear of a motor to transmit torque to the transmission. Also positioned in the housing are a second reduction gear, a second reduction gear carrier, and a second set of reduction gears which are coupled with the first reduction carrier, the second reduction ring gear, and the second reduction gear carrier to transmit torque. Further, included in the housing is a third reduction ring gear, a third reduction gear carrier, and a third set of reduction gears which are coupled with the second reduction gear carrier, the third reduction ring gear and the third reduction ring gear carrier to transmit torque. An output member, which rotates at a desired speed, is coupled with the third reduction gear carrier. A mechanism for adjusting speed of the output member is coupled with the third reduction ring gear and the second reduction ring gear. The mechanism for adjusting speed is slidably biased in the housing such that upon change in torque, the adjustment mechanism moves in the housing engaging or disengaging the second reduction ring gear with the second set of reduction gears to vary the speed of the output member. Preferably, a cam mechanism, which slidably moves the speed adjusting mechanism, is coupled with the speed adjustment mechanism and the third reduction ring gear. Also, the mechanism for adjusting speed includes a clutch mechanism to engage the third reduction ring gear and an annular member with at least one projecting member, on its exterior surface, which slides in a groove of the housing. The annular member includes a conical surface on its inner surface to engage a conical surface on the second reduction ring gear.

In accordance with the second aspect of the invention, an automatic transmission for a power tool comprises a first shaft adapted to be rotatably secured in a tool housing, a second shaft to be rotatably secured in the tool housing, an output member coupled with the second shaft, a first gear positioned on the first shaft adapted to couple with a pinion of a motor, a drive sleeve fixed on the second shaft, a second gear axially movable on the second shaft with the second gear selectively engagable with the drive sleeve, a third gear axially movable on the first shaft and meshing with the second gear, a fourth gear fixed on the second shaft, the fourth gear meshing with the first shaft, and a mechanism for adjusting speed of the second shaft. The mechanism for adjusting speed is axially movable which, in turn, causes the third gear to engage or disengage the second gear with the drive sleeve and to drive the first shaft which, in turn, drives the fourth gear which drives the second shaft driving the output member between a first and second speed. The mechanism for adjusting speed includes a clutch mechanism on the first shaft and a cam mechanism axially sliding the third gear on the shaft. The clutch mechanism includes a first biased ring member, which is axially slidable on the first shaft, and a second biased ring member which is axially slidable on and engagably meshed with the first shaft, where the first ring member engages the second ring to drive the first shaft. Further the first ring member has a conical surface and the second ring has an extending skirt with a conical surface to mate with the first ring member conical surface. Also, the cam mechanism includes a cam member on the first or third gear and a mating cam surface on the other of the first or third gear.

In accordance with the third aspect of the invention, a power tool includes a tool housing, a motor in the tool housing, a power source for energizing the motor, an output member coupled with the motor for rotating at a desired speed, and a device including the automatic transmission in accordance with either the first or second aspect of the invention described above.

Additional objects and advantages of the invention will be apparent from the detailed description of the preferred embodiment, the appended claims and the accompanying drawings or may be learned by practice of the invention.

BRIEF DESCRIPTION OF THE DRAWINGS

The accompanying drawings which are incorporated in and constitute a part of the specification, illustrate two embodiments of the present invention and together, with the description, serve to explain the principals of the invention. In the drawings, the same reference numeral indicates the same parts.

FIG. 5 is an exploded perspective view of another embodiment of the first reduction carrier and second reduction ring carrier.

FIG. 6 is an exploded perspective view of another embodiment of the first reduction carrier and second reduction ring carrier.

FIG. 7 is a perspective view partially in cross-section of another embodiment of the first reduction carrier and second reduction ring carrier.

FIG. 10 is a cross-section view of another embodiment of the first reduction carrier and second reduction ring carrier.

FIG. 11 is a cross-section view of another embodiment of the first reduction carrier and second reduction ring carrier.

DETAILED DESCRIPTION OF THE PREFERRED EMBODIMENT

Figure 1:
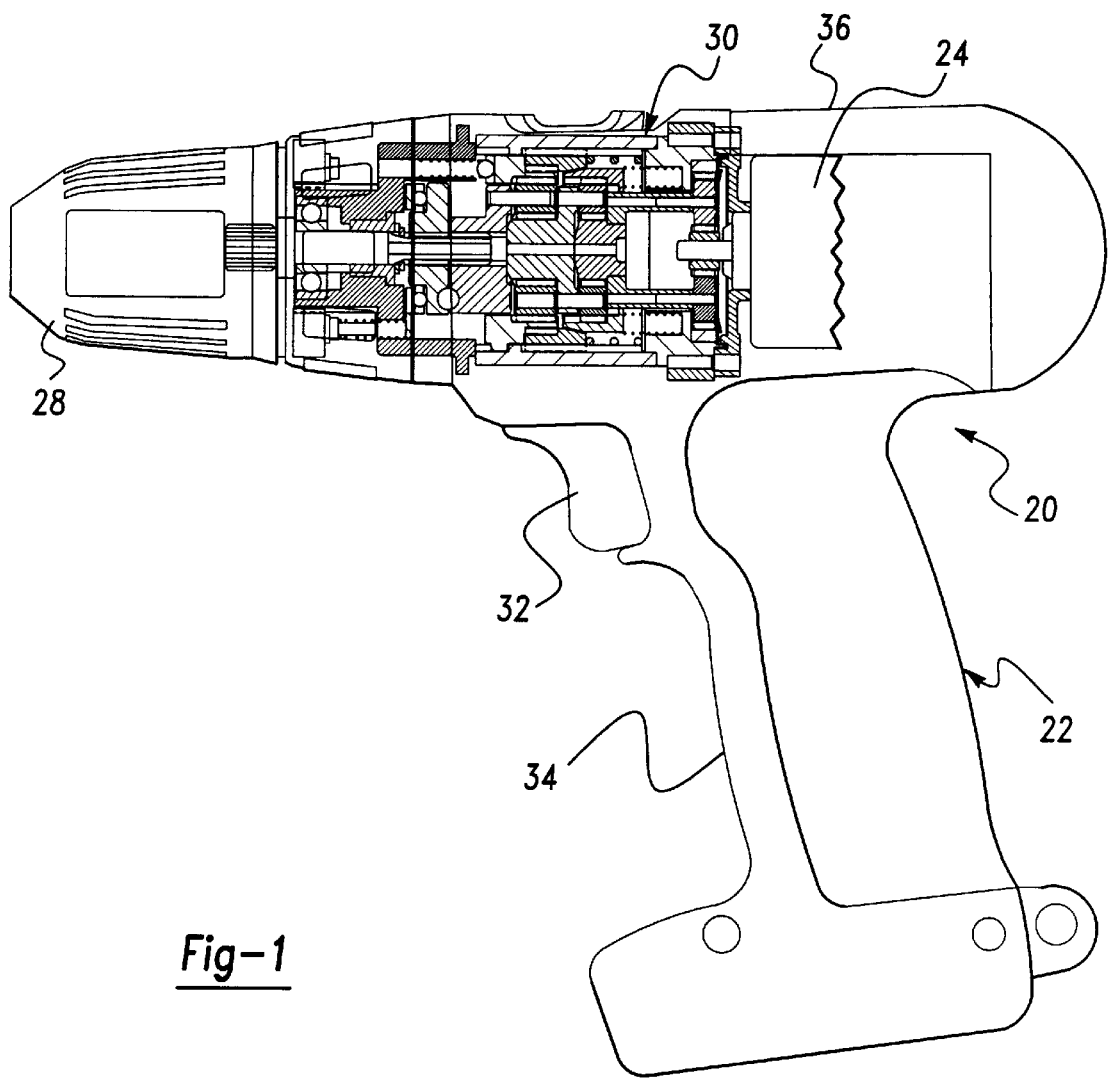
FIG. 1 is a side view, partially in section, of a power tool in accordance with the present invention.
Figure 2:
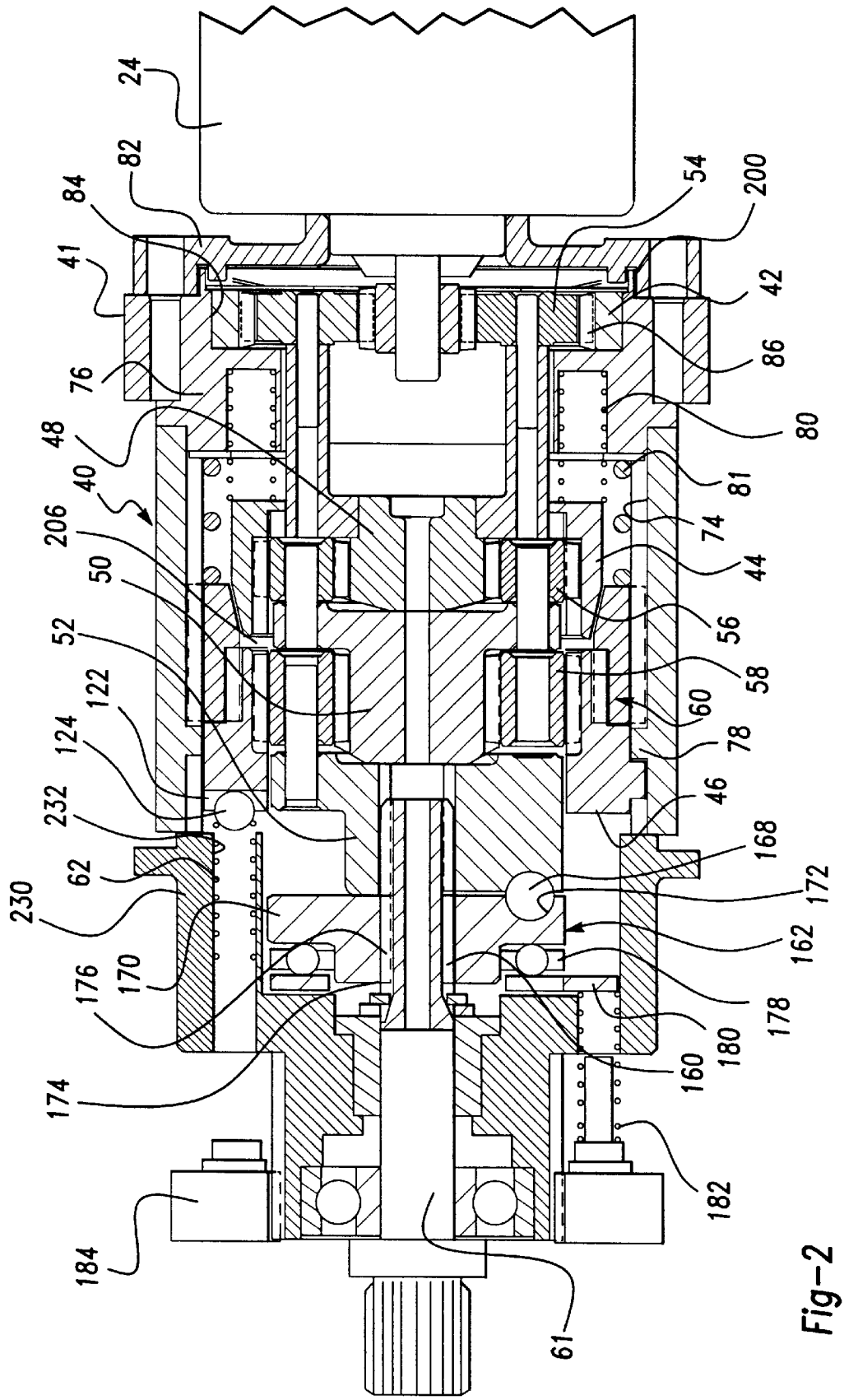
FIG. 2 is an enlarged side view, like FIG. 1, of the transmission with the speed adjustment mechanism disengaged.
Figure 3:
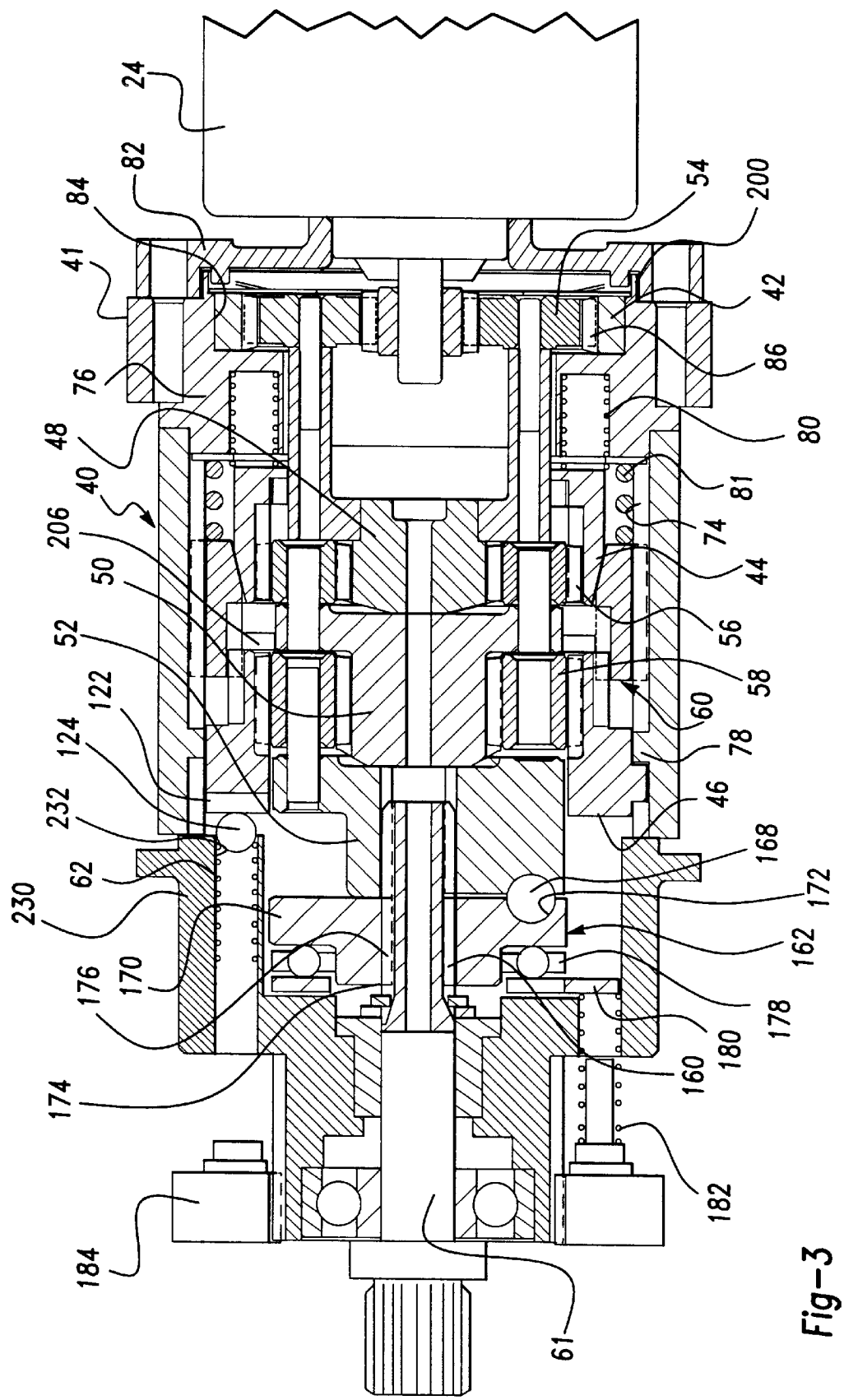
FIG. 3 is a view like FIG. 2 in an engaged position.

The preferred embodiment of the present invention may be either a cord or cordless (battery operated) device such as a portable electric device such as a power tool, drill or screwdriver. An example of such device is a drill as illustrated in FIG. 1. The preferred embodiment more particularly is a variable speed transmission 30 and 300 to change the speed of the output member of the device. As illustrated in FIGS. 1 through 3, in accordance with the present invention, a power tool 20, herein exemplified as a drill, comprises a housing 22 which may receive battery packs or include a cord, a motor 24, an output spindle 28 and a drivetrain intermediate the motor spindle including a variable speed transmission designated with the reference numeral 30. Also an on or off speed control switch 32 is included to electrically activate the power tool. The housing includes a handle portion 34 and a motor and drivetrain portion 36.

Turning to the transmission 30 (FIGS. 2–4), the transmission includes a transmission housing 40, first, second and third reduction ring gears 42, 44 and 46; first, second and third reduction gear carriers 48, 50 and 52; and three sets of planetary gears 54, 56 and 58. Also, an annular member 60 and clutch 162 are associated with the transmission to adjust the speed of the output member 61.

The housing 40 is a two-piece cylinder having an interior wall surface 70 and an exterior wall surface 72. The interior wall surface 70 includes a plurality of grooves 74 which enable the annular member 60 to be retained in and slide within the grooves 74. The interior surface 70 also includes a radially extending ledge 78. The ledge 78 supports the third reduction gear ring 46. The ledge 76, which is on the other part 41 of the housing, supports a thrush washer 83 which, in turn, connects spring 81 which bias the annular member 60 and second reduction ring gear 44, respectively. The second housing part 41 also includes member 82 to secure the transmission housing to the motor. A pocket 84, which receives the first reduction ring gear 42, is adjacent the radial ledge 76.

The first reduction ring gear 42 is an annular member press fit into the second housing part 41. The first reduction ring gear 42 includes a plurality of teeth 86 on its inner circumferential surface which mesh with planet gears 54.

The second reduction ring gear 44 is an annular member having an exterior wall surface 90 and an interior wall surface 92. The interior wall surface 92 includes a plurality of teeth 94 and, adjacent the teeth 94, a plurality of alternating lugs and recesses 96 and 98. Also, a radially extending flange 100 serves as the base of the lugs and recesses. At the other end of the second reduction ring gear on the exterior wall 90, the exterior wall includes a conical surface 102. The conical surface 102, as will be described herein, mates with the annular member 60 to axially move the second reduction ring gear 44 against the bias of springs 80 and 81 to enable the second reduction gear carrier to spin freely with respect to the first reduction ring carrier. The teeth 94 and second ring gear 44 mesh with the second set of planetary gears 56.

The third reduction ring gear 46 is an annular member with an inner surface 104 and an exterior wall surface 106. The interior wall surface 104 includes a plurality of teeth 108 which mesh with the third set of planetary gears 58. Also the inner surface 104 includes a smooth surface portion 110 adjacent the teeth 108. The smooth surface 110 enables the third reduction ring carrier 52 to pass through the third reduction ring gear 46. The exterior wall surface 106 has a first cylindrical portion 112 with a diameter which enables it to pass through the radial flange 78 on the housing 40. At least one projecting member 114 extends from the smooth cylindrical exterior surface to retain the third reduction ring gear 46 against the housing flange 78. The exterior surface 106 includes one or more cam surfaces 115 cut into the cylindrical wall 112. The cam surface 115 includes a pair of cam walls 116 and 118 which intersect one another to provide the cam surface 115 with an overall V-shape.

On the output face 120 of the third reduction ring gear 46, at least one clutch pocket 122 is formed in the face 120. The clutch pockets 122 receive members 124 from the clutch 62 which engage and disengage the automatic transmission. The pockets 122 generally have angled side walls 126 which enable the members 124 to move in and out of the pockets 122. The third reduction ring gear 46 rotates about twenty to thirty degrees on the housing flange 78 which, in turn, effects the change of speed of the transmission.

The first reduction carrier 48 includes a disc shaped body 126, a sun gear 128 and a plurality of pin retaining members 130. The pin retaining members 130 and sun gear 128 are on opposite sides of the disc body 126. The sun gear 128 has teeth 132 which mesh with the second set of planetary gears 56. The pin retaining members 130 include pins 134 which act as axles for the planet gears 54. Also, the body 126 includes a plurality of alternating spaced lugs 136 and recesses 138 which mesh with the lugs 96 and recesses 98 of the second reduction ring gear 44 to lock the second reduction ring gear 44 with the first reduction ring carrier 48, in a first position, when the transmission is in a high speed as seen in FIG. 2.

The second reduction carrier 50 includes a disc shaped body 140, a sun gear 142 and a plurality of apertures 144 in the disc body 140. The sun gear 142 meshes with the third set of planetary gears 58. The sun gear portion 142 has a plurality of teeth 146 on its exterior surface which mate with the teeth of the planet gears 58. The apertures 144 receive pins 150 which act as axles for the planet gears 56.

The third reduction carrier 52 includes a disc shaped body 152 and a plurality of pin holding members 154 extending from the disc shaped body 152. The pin holding members 154 hold pins 156 in the members and act as axles for the third set of planetary gears 58. The disc shaped body 152 includes a central aperture 158 to receive the output member. The aperture 158 may include teeth (not shown) which would mesh with teeth 160 on the output member when a clutch is not present. However, in this embodiment, a clutch 162 for controlling torque of the output member is present. The output face 164 of the third reduction ring carrier 52 includes at least one pocket 166 to receive ball members 168 from the clutch 162.

The clutch 162 includes a drive disc 170 which has a plurality of pockets 172 on one of its faces and a central aperture 174 which includes a plurality of teeth 176 which mesh with the teeth 160 of the output member. Also, the clutch includes a ball cage 178 and disc member 180 as well as springs 182 which are secured with the adjustable ring 184 to adjust the clutch output. The clutch 162 works in a conventional manner to provide the desired output torque.

The planet gears 54 include teeth 192 which mesh with the teeth of the first reduction ring gear 42. The teeth 192 also mesh with the teeth 194 of a pinion gear 196 which is mounted to a motor shaft 198. Thus, while energizing the motor 24, the shaft 198 rotates which, in turn, rotates the pinion 196 which meshes with the planet gears 54. A thrust plate 200 serves to retain the planet gears 54 against axial movement.

The second and third set of planetary gears 56 and 58 include teeth 202 and 204, respectively, which likewise mesh with the sun gear portion 128 and sun gear portion 142 of the first and second reduction ring carriers 48, 50, respectively. Also, the teeth 202 and 204 of the second and third set of planetary gears 56, 58 mesh with the teeth 94, 108 of the second and third reduction ring gears 44 and 46, respectively. A thrush washer 206 is positioned between the second reduction carrier 50 and the third set of planetary gears 58.

The annular member 60 includes a cylindrical outer surface 210 and an inner surface 212. The outer surface 210 includes a plurality of projecting members 214 which are maintained in the housing grooves 74. The members 214 slide in the grooves 74 which enable axial movement of the annular member 60. The cylindrical inner wall surface 212 of the annular member 60 includes one or more cam members 216. The cam member 216 projects from the inner wall surface 212 and has an overall V-shape. The member 216 has a pair of surfaces 218 and 220 which mesh with the V-shaped cam surfaces 116 and 118 of the third reduction ring gear 46. Adjacent the cam members 216 on the inner surface 212 of the annular member 60, the inner wall face 212 includes a conical face 222 which abuts with the conical face 102 of the second reduction ring gear 44.

The clutch 62 includes a housing 230 which is adjacent and connected with the housing 40. Inside the housing 230, the clutch includes one or more members 124 which are biased with springs 232. The springs 232 have desired characteristics to enable the transmission to shift at desired loads or torque.

In a first or high speed, the transmission operates as follows. The motor 24 is energized which, in turn, rotates the motor shaft 198 which rotates the pinion gear 196. The pinion gear 196 which meshes with the first set of planet gears 54 against the first reduction ring 42. Rotation of the planet gears 54 rotates the first reduction carrier 48. The second reduction ring gear 44 is biased by spring 80 such that the alternating lugs 96, 136 and recesses 98, 138 of the first reduction carrier and the second reduction ring gear are locked together. Thus, rotation of the first reduction carrier 48 is transmitted to the second reduction ring gear 44, which is locked with the first carrier 48, which, in turn, locks the second set of planetary gears 56 which, in turn, locks the second reduction carrier 50 causing the first and second reduction carriers to rotate together at the same speed. The sun gear 142 of the second reduction ring gear 50 rotates the planetary gears 58 which, in turn, rotate the third reduction carrier 52. The clutch 162 is coupled with the third reduction carrier 52 which, in turn, rotates the output member.

As increased torque is required, the third reduction ring gear 46 rotates in the housing 40 causing the ball members 124 to be moved out of pocket 122 back into the clutch housing 230. At this time, the third reduction ring gear 46 rotates which causes the annular member 60 to move downward against the spring force of springs 80 and 81. This movement is effected by the cam members 115 and 216. As the annular member 60 moves axially in the housing 40, the conical surface 222 contacts the conical surface 102 of the second reduction ring gear 44 to cause the second reduction ring gear 44 to move against the springs 80 and 81 bottoming out on thrust washer 83. This movement disengages the lugs 96, 136 and recesses 98, 138 of the second reduction ring gear 44 and the first reduction carrier 48 (see FIG. 3). As this happens, the first reduction carrier 48, via the sun gear 128, rotates the second set of planetary gears 56 which, in turn, rotate the second reduction carrier 50 independently of the first reduction carrier 48 which, in turn, rotates the third set of planetary gears 58 which, in turn, rotates the third reduction carrier 52 and, via clutch 162, rotates the output member 61. Thus, with the three sets of reduction gearing, a low speed is accomplished.

As the load or torque is removed, the force of springs 80 and 81 push against the second reduction ring gear 44 moving it back into engagement with the first reduction carrier 48. The upshifting from the low speed into the high speed reengages the lugs 96, 136 and recesses 98, 138.

Turning to FIGS. 5 to 14, additional embodiments of the first reduction carrier and second ring gear are shown. At the reengagement of the first reduction carrier and second reduction ring gear, the first reduction carrier is rotating and the second reduction ring gear is non-rotating. Thus, the additional embodiments illustrate alternate solutions to reengage the parts.

The second reduction ring gear $44_1$ is like that previously discussed and includes an exterior wall $90_1$ and interior wall $92_1$, a plurality of teeth $94_1$ and three alternating lugs $96_1$ and recesses $98_1$. Further, the reduction ring gear includes a conical surface $102_1$ which mates with the annular member 60 as previously described.

Turning to FIG. 5, only the first reduction carrier and second reduction ring gear are illustrated and designated with the reference numerals $48_1$ and $44_1$. The first reduction carrier $48_1$ is substantially the same as that illustrated in FIG. 4. The first reduction carrier $48_1$ includes a dish shaped body $126_1$, a press fit sun gear 128, and a plurality of pin retaining members 130. The difference is that the first reduction carrier includes only three lugs $136_1$ and three recesses $138_1$ which mesh with the lugs $96_1$ and recesses $98_1$ of the second reduction ring gear $44_1$ to lock the second reduction ring gear $44_1$ with the first reduction ring carrier $48_1$ in the first position as illustrated in FIG. 2 above. Note that there is a substantial amount of clearance in the recesses 98, for movement of the lugs 136.

FIG. 6 illustrates another embodiment of a second reduction ring gear $44_2$ and a first reduction carrier $48_2$. In this embodiment, the second reduction ring gear $44_2$ and the first reduction carrier $48_2$ are like those previously illustrated in FIG. 4 except that the lug and recesses are different. Here, the lugs $96_2$ include chamfers or angular surfaces 97 and 99 and the recesses $98_2$ are slightly larger than the lugs $136_2$ so that clearance is present when the second reduction ring gear $48_2$ is engaged with the first reduction carrier $44_2$.

The first reduction carrier $48_2$ likewise includes lugs $136_2$ and recesses $138_2$ which mesh with the lugs $96_2$ and recesses $98_2$ of the second reduction ring gear $44_2$ to lock the second reduction ring gear with the first reduction ring gear $48_2$ in a first position when the transmission is in a high speed as seen in FIG. 2. Likewise, the lugs $136_2$ include chamfers or angled surfaces 137 and 139. Also, the recesses $138_2$ are peripherally wider than the lugs $136_2$ to provide the above described clearance.

FIG. 7 illustrates another embodiment of a first reduction carrier in accordance with the invention. The reduction carrier $48_3$ includes a rotatable ring 402 which may include any of the above designed lug and recess designs. The ring 402 is rotatably retained on the body 404 by a thrust washer 406 which is held in position by press fitting the sun gear 128 into an aperture in the body $126_3$. Thus, the ring 402 is rotatable with respect to the body $126_3$.

A plurality of clutch members 408 are retained in bores 410 in the body $126_3$. The clutch mechanisms 408 include a spring 412, a ball 414, and a set screw 418 which adjusts the force of the spring. Also, the ring 402 includes indentions 420 which enable the balls to seat therein to prohibit rotation of the ring 402.

The clutch mechanisms work like conventional clutches such that when the drive lugs begin to engage the second reduction ring gear, the ring 402 would be able to, and begins to, spin until the lugs $136_3$, and recesses $138_3$ synchronize with lugs and recesses of the second reduction ring gear and mesh with one another.

Figure 8:
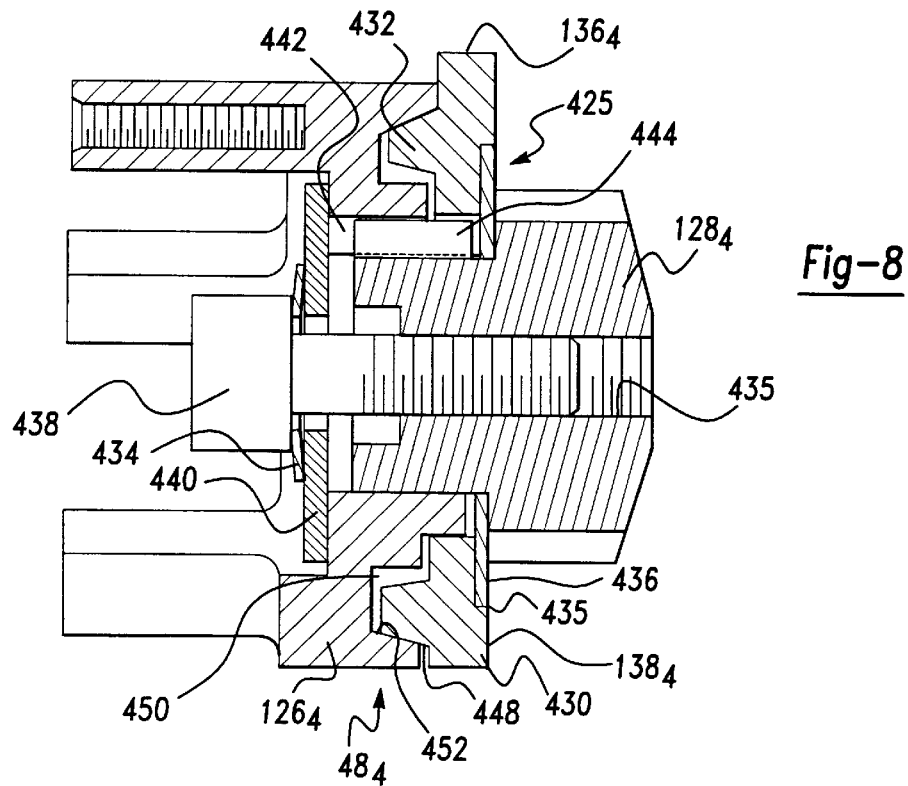
FIG. 8 is a cross-section view of another embodiment of the first reduction carrier and second reduction ring carrier.

FIG. 8 is an additional embodiment of a first reduction carrier $48_4$ similar to that of FIG. 7 including a friction slip clutch 425. The first reduction carrier $48_4$ includes a ring 430 with an extending annular flange $126_4$ having a conical cross section. The ring 430 is retained onto the body 434 via a thrush washer 436. The thrust washer 436 is seated in an annular groove 435 in the ring 430. Also, the washer 436 is held onto the body via the sun gear $128_4$ which is secured to the body via a fastener 438 screwed into a threaded bore. Also, a leaf spring 437 is adjacent the head of the fastener 438 which is biased against a thrush washer 440. The sun gear $128_4$ as well as the body $126_4$ include splines 442 and 444 to enable the sun gear to rotate with the body $126_4$. The ring 430 is rotatably held onto the reduction carrier by thrush washer 436. The outer surface 448 of the cone shaped ring contacts an annular conical surface 462 of an annular recess 450 to provide a friction clutch surface between the ring 430 and the body $126_4$. As the second reduction ring gear contacts the lugs $136_4$ and recesses $138_4$ of the ring 430, the ring 430 begins to spin in the recess 450. As this occurs, the surface friction between the ring 430 and the body $126_4$ is overcome rotating the ring until the ring 430, lugs $136_4$ and recesses $138_4$ mesh with the lugs and recesses of the second reduction ring gear synchronizing their speed such that the second reduction gear and the first reduction carrier rotate at the same speed.

Figure 9:
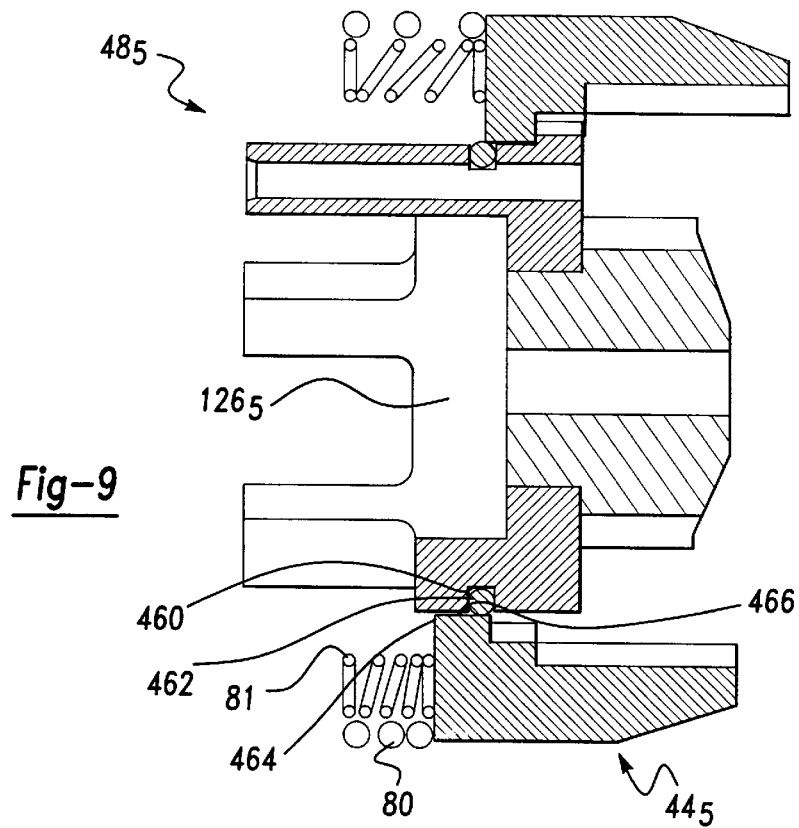
FIG. 9 is a cross-section view of another embodiment of the first reduction carrier and second reduction ring carrier.

Turning to FIG. 9, an additional embodiment of a first reduction carrier is illustrated. Here, the first reduction carrier $48_5$ is similar to that illustrated in FIG. 2 except the body $126_5$ includes a recess 460 which seats an O-ring 462. The O-ring may be of an elastomeric or metallic material.

The first reduction ring gear $44_5$ is similar to that disclosed in FIG. 2, however the circular opening 464 in the base is slightly larger to accommodate the O-ring.

As the second reduction ring gear 445 upshifts from the low speed into the high speed, the annular surface 466 of the second reduction ring gear drags on the O-ring 462, as seen at the bottom of FIG. 9, which, in turn, begins to rotate the second reduction ring gear. As the springs 80 and 81 continue to force the second reduction ring gear 445 into a meshing arrangement between the lugs and recesses of the second reduction ring gear and the first reduction carrier, the second reduction ring gear is rotated by the friction between the O-ring 462 and the annular surface 466 until the second reduction ring gear 445 reaches a synchronized speed with the first reduction carrier 485 and the springs force the lugs and recesses into a meshing engagement.

FIG. 10 illustrates an additional embodiment of the second reduction ring gear $44_6$ and the first reduction carrier $48_6$. The second reduction ring gear $44_6$ is substantially the same as those previously described and may include any of the above described lug and recess configurations. However, the second reduction ring gear $44_6$ includes a flange 480 including a steep angle on one of its sides 482 at its end opposing the gear teeth. This flange 480 engages with lugs 486 which will be discussed herein.

The first reduction carrier $48_6$ includes lugs and recesses like those previously described, as well as a sun gear $128_6$ press fit into an aperture in the body $126_6$. The body $126_6$ also includes radially extending stepped apertures 484 which receive lugs 486. The apertures 484 have a radial depth deeper than the lugs to enable the lugs to radially move in the body $126_6$ in response to centrifugal forces. The lugs 486 have an overall T-shape in cross section with the horizontal flanges 488 retaining the lugs within the apertures 484. On the bottom of the vertical end 489 of the lug 486, the lug 486 includes an angled surface 490 which acts as a stop. This angled surface 490 contacts the angled surface 482 of the second reduction ring gear $44_6$. The body $126_6$ includes five apertures 484 and five lugs 486 positioned into the apertures 484.

When the second reduction ring gear downshifts from the high speed to the low speed, the lugs 486 are pushed inward and the second reduction ring gear $44_6$ easily passes over the lugs 486 into a down position. As the transmission upshifts, the springs 80, 81 force the second reduction ring gear $44_6$ to the right. The angled surfaces 490 of the lugs 486 contact the angled surfaces 482 of the second reduction ring gear 490. As this happens under full power, the ring gear $44_6$ hits the steep angled surface 490 of the lugs 486 and is prevented from upshifting until full power is removed. As full power is removed, the transmission slows, decreasing the centrifugal forces which, in turn, enable the ring gear $44_6$ to force the lugs 486 radially inward to enable the second reduction ring gear 44₆ to pass over the lugs 486 and back into a high speed position.

Moving to FIG. 11, a second reduction ring gear 44₇ and a first reduction carrier 48₇ are shown. Here, the second reduction ring gear 44₇ and the first reduction carrier 48₇ are substantially the same as those illustrated in FIG. 10 except the angles of the lug surfaces 490 and the angled surface 482 of the second reduction ring gear are much shallower. Here, due to the shallowness of the angles of the surfaces 482, 490, the surfaces act as a synchronizer instead of a stop. As the second reduction ring 447 gear begins to upshift, the second reduction ring gear surface 482 contacts the lug surface 490 which, in turns, rotates the second reduction ring gear 44₇, until it reaches a synchronized speed. At that time, the centrifugal force of the lugs 486 is overcome and they are pushed radially inward which enables the second reduction ring gear 44₇ to upshift and mesh with the lugs and recesses of the first reduction carrier.

Figure 12:
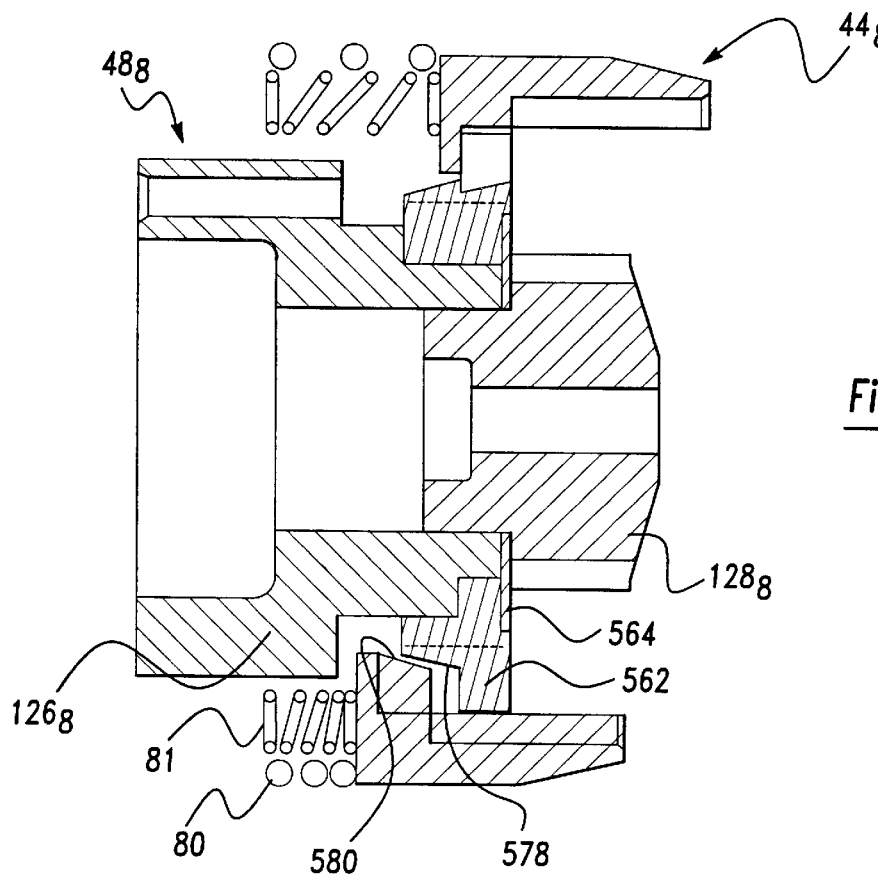
FIG. 12 is a cross-section view of another embodiment of the first reduction carrier and second reduction ring carrier.
Figure 13:
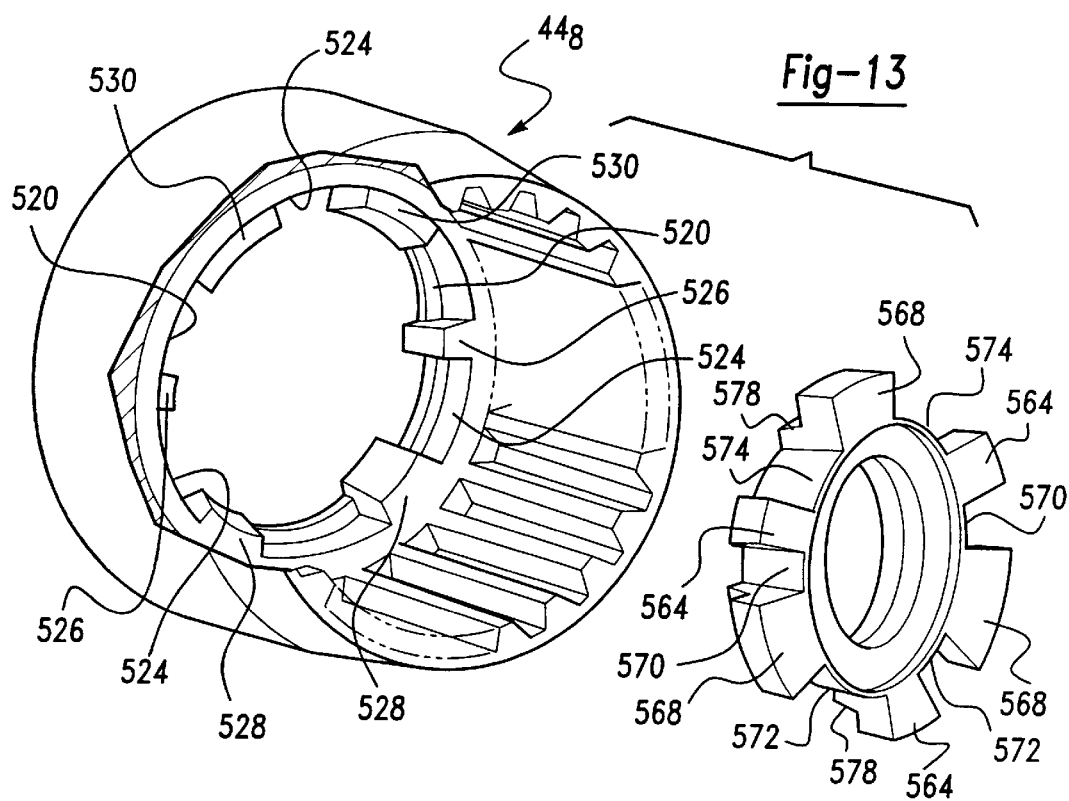
FIG. 13 is an exploded perspective view of FIG. 12 without the second reduction ring gear.

Turning to FIGS. 12 and 13, an additional embodiment is shown. FIG. 12 illustrates a second reduction ring gear 44₈ and a first reduction carrier 48₈. The second reduction ring gear 44₈ is similar to those previously described including the gear teeth and outer conical surface. However, the lug and recess arrangement is different.

As seen in FIG. 13, the lugs and recesses are such that a first set of recesses 520 have a smaller circumferential width than a second set of alternating recesses 524. Likewise, the lugs are also different. A first pair of lugs 526 oppose one another and have substantially the same circumferential width. A second set of lugs 528 which are adjacent one another have a somewhat wider circumferential width than the lugs 526 and are on one side of the second reduction ring gear. Opposing the lugs 528 are an additional pair of lugs 530 which have an even greater circumferential width than the lugs 528. This lug and recess arrangement provides a single meshing configuration between the first reduction carrier 48₈ and the second reduction ring gear 44₈. Thus, it is only possible for the two to mesh once per revolution. Also in cross section, all of the lugs have a conical surface 532 which aids in synchronizing the second reduction ring gear speed as will be discussed herein.

The first reduction carrier 48₈ includes a body 126₈ and a lug carrier ring 562 rotatable with respect to the body 126₈. Also, a sun gear 126₈ is press fit into an aperture in the body 126₈ and a thrush washer 564 is positioned between the sun gear 128₈ and the lug carrier ring 562. The lug carrier ring 562 includes a corresponding lug and recess arrangement.

The carrier ring 562 includes a first set of lugs 564 which have a peripheral width just smaller than the second set of lugs 568. The lugs 564 and 568 alternate and are spaced such that they only mesh in one direction with the lugs and recesses of the second reduction ring gear 448. The recesses 570 oppose one another and have a small peripheral width. The recesses 572 have a peripheral width larger than those of recesses 570 and are adjacent one another on one half of the lug carrier ring. A third set of recesses 574 have a peripheral width larger than those of recesses 572. The recesses 574 are adjacent one another on one side of the lug carrier ring opposing the recesses 572.

The lugs includes a conical surface 578 which contacts the conical surfaces 580 of the lugs of the second reduction ring gear to start rotation. As can be seen in FIG. 12, as the second reduction ring gear 44₈ is upshifted from the low speed to the high speed, the force of the spring 80, 81 pushes the second reduction ring gear into contact with the lug carrier ring. As this occurs, the conical surfaces 578, 580 contact one another to rotate the lug carrier with respect to the body 126₈ as well as to rotate the second reduction ring gear 44₈. As this continues, the ring gear 44₈ and the lug carrier ring 562 begin to synchronize and since there is only one meshing orientation, the second reduction ring gear 44₈ will rotate until it synchronizes and meshes with the lug carrier ring 562. As this occurs, the second reduction ring gear 44₈ and the first reduction carrier 48₈ move into the high speed position. Also, the clearance between the lugs and recesses is such that the engagement cannot occur if the relative speeds are too high with respect to one another.

Figure 14:
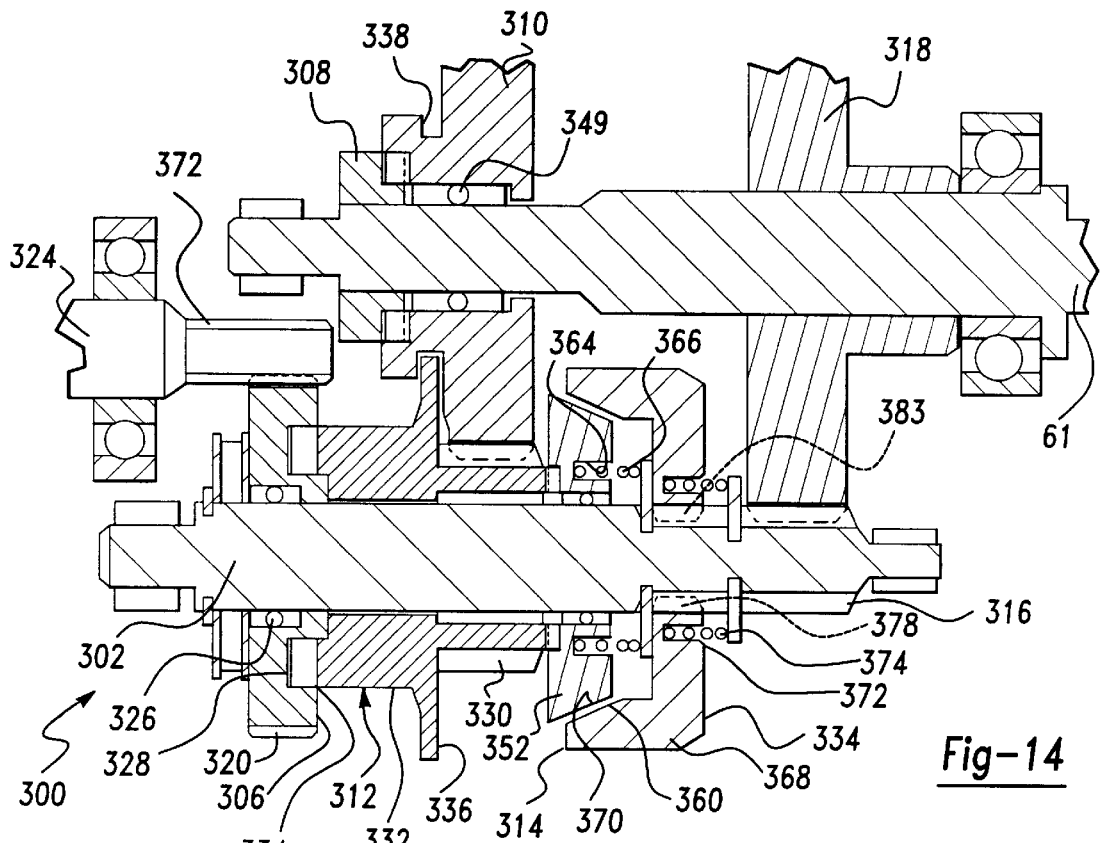
FIG. 14 is a side view partially in section of a second embodiment of a power tool in accordance With the present invention with the speed adjustment mechanism in a disengaged position.
Figure 15:
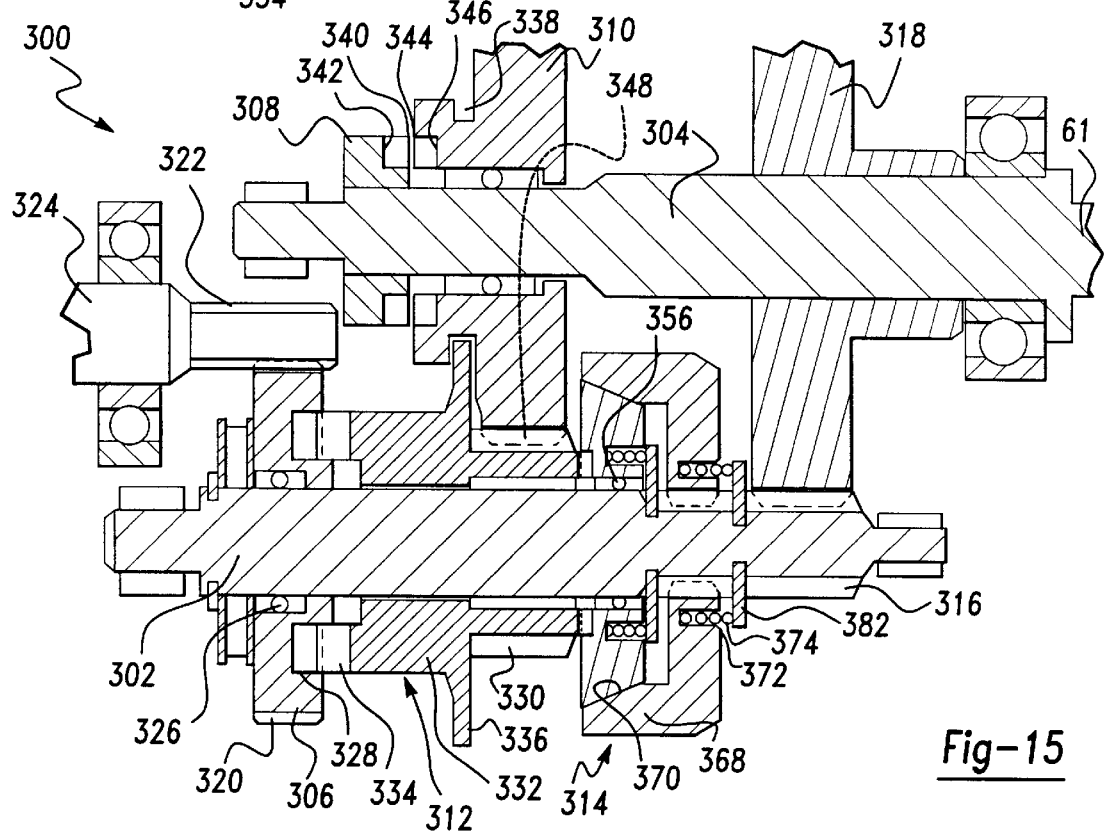
FIG. 15 is a side view like FIG. 5 with the speed adjustment mechanism in an engaged position.

Moving to FIGS. 14 and 15, an additional embodiment of the present invention is shown. The transmission is a spur gear design and may be utilized in a drill housing like that shown above and the same reference numerals will be used to identify the same parts.

The transmission 300 includes a first shaft 302, a second shaft 304 secured with the output member 61, a first reduction gear 306 on the first shaft, a first drive sleeve 308 on the second shaft, a second gear 310 on the second shaft, a third gear 312 on the first shaft 302, and a mechanism 314 for adjusting the speed of the transmission. Also, the first shaft 302 includes teeth 316 which drive a fourth gear 318 secured to the second shaft 304.

The first reduction gear 306 includes teeth 320 to mesh with teeth 322 on the motor shaft 324. Gear 306 is rotatably mounted on the shaft 302 via a bearing 326. The gear 306 includes an annular recess 328 on its outer surface. The annular recess 328 includes at least one cam surface or cam member like those previously described on the annular member 60 and the third reduction ring gear 46.

The third gear 312 is adjacent the first gear 306 and is axially movable along the shaft 302. The third gear 312 includes a first collar portion having teeth 330 meshingly engaging with the second gear teeth. Also, the third gear 312 includes a second collar portion 332 adjacent the first portion which, at its free end, includes a flange 334 with the reciprocating cam member or cam recess, like those previously discussed, mating with the first gear 306. Also, an extending radial flange 336 is positioned between the first and second collar portions which extends into a recess 338 in the second gear 310 which enhances movement of the second gear 310 by the third gear 312.

The drive sleeve 308 is fixedly secured to the second shaft 304. The drive sleeve 308, on one of its end faces, includes an alternating arrangement of lugs 340 and recesses 342 which mate with an alternating set of lugs 344 and recesses 346 in the end face of the gear 310. This lug and recess arrangement is analogous with the lug and recess arrangement of the second reduction ring gear and first reduction carrier. Thus, when the lugs 340, 344 and recesses 342, 346 are engaged with one another, the drive sleeve 308 is driven by the second gear 310 which, in turn, drives the output shaft 304.

The second gear 310 includes teeth 348 and is axially slidable along the shaft 304 and is rotatable on the shaft 304 via bearing 349. As mentioned above, the gear 310 includes a radial recess 338 to receive the radial flange 336 of the third gear 312 to enable the axial movement of the second gear 310 to move the lug and recess arrangement out of contact with the drive sleeve 308 to enable the transmission to shift to its second speed.

The mechanism for adjusting speed 314 includes a first annular member 352 and a second annular member 354. The first annular member 352 is rotatably supported on the shaft 302 via a bearing 356. The first annular member 352 is axially slidable along the shaft 302. The outer circumferential surface of the first annular member 352 has a conical surface 360. Also, the first annular member 352 includes a recess 364 on its front face which receives a spring 366 which biases the first annular member 352 and 312. Spring 366 also determines the shift point by applying load to the cam surface 328.

The second annular member 354 includes a skirt 368 which has a inner circumferential surface which includes a conical portion 370 that is adjacent the conical surface 360 of the first annular member 352. The conical surfaces 360, 370, which correspond to one another, function like the conical surface of the annular member 60 and second reduction ring gear 44. The second annular member 354 also includes a circumferential recess 372 which retains a biasing spring 374. The annular member 354 also includes a central aperture 378 which includes teeth 380 which mesh with the teeth 316 of the first shaft 302. A thrust washer 382 acts as a stop for the biasing member 374.

The fourth gear 318 includes teeth 386 which mesh with teeth 316 of the first shaft 302. The fourth gear 318 is fixably secured to the second shaft 304. The output shaft could include a clutch like that previously described in the first embodiment.

In operation, in a first speed, the motor shaft 322 rotates the first gear 306 which, in turn, rotates the third gear 312 which rotates the second gear 310. In the first position, the lugs and recesses of the second gear and drive sleeve are engaged so that the drive sleeve rotates the output shaft 304 and the output member. As the torque increases, the transmission shifts from high speed to low speed. As this occurs, the first gear 306 rotates with respect to the first shaft 302 causing the cam member 326 and surface 334 to separate with respect to one another. As this happens, the third gear 312 is moved axially along the shaft 302. As the third gear 312 moves axially, it in turn axially moves the second gear 310 along the second shaft 304 to disengage the second gear 310 from the fixed sleeve 308 therefore decoupling the rotation of the shaft 304 by the fixed sleeve 308. As the third gear 312 moves axially, it moves the first annular member 352 axially, which causes its conical face to engage the conical face of the second annular member 354, which imparts the rotation from the motor shaft onto the second annular member 354 which, in turn, via teeth 380 and shaft teeth 316 rotates the shaft 302. As the shaft 302 begins to rotate, the teeth 316 meshing with the gear teeth 386 begins to rotate the output shaft 304 at a lower speed. Thus, the transmission automatically shifts between a high and low speed.

Figure 16:
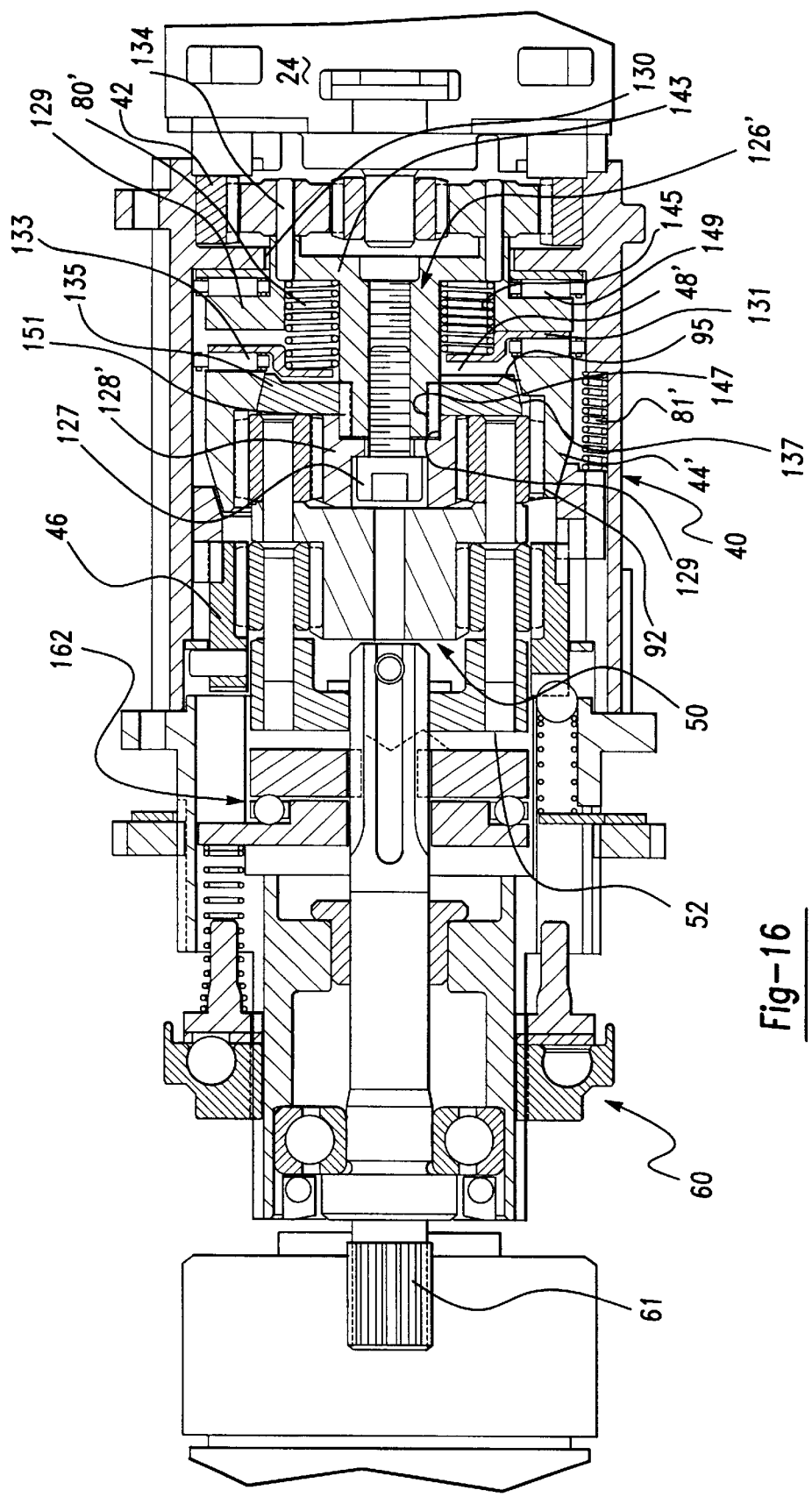
FIG. 16 is a cross-sectional view of an additional embodiment of the transmission of the present invention.

Turning to FIG. 16, an additional embodiment of the invention is shown. Elements which have been previously disclosed are identified with like numerals.

The transmission includes a transmission housing 40; first, second and third reduction ring gears 42, 44' and 46; first, second and third reduction ring carriers 48', 50 and 52; and three sets of planetary gears 54, 56 and 58. Also, an annular member 60 and clutch 162 are associated with the transmission to adjust the speed of the output member 61.

The differences between the prior embodiment and this embodiment are in the second reduction ring gear 44' and the first reduction gear carrier 48'. Also, the spring 81 has been modified to include a plurality of springs 81' to bias the annular member 60.

Figure 17:
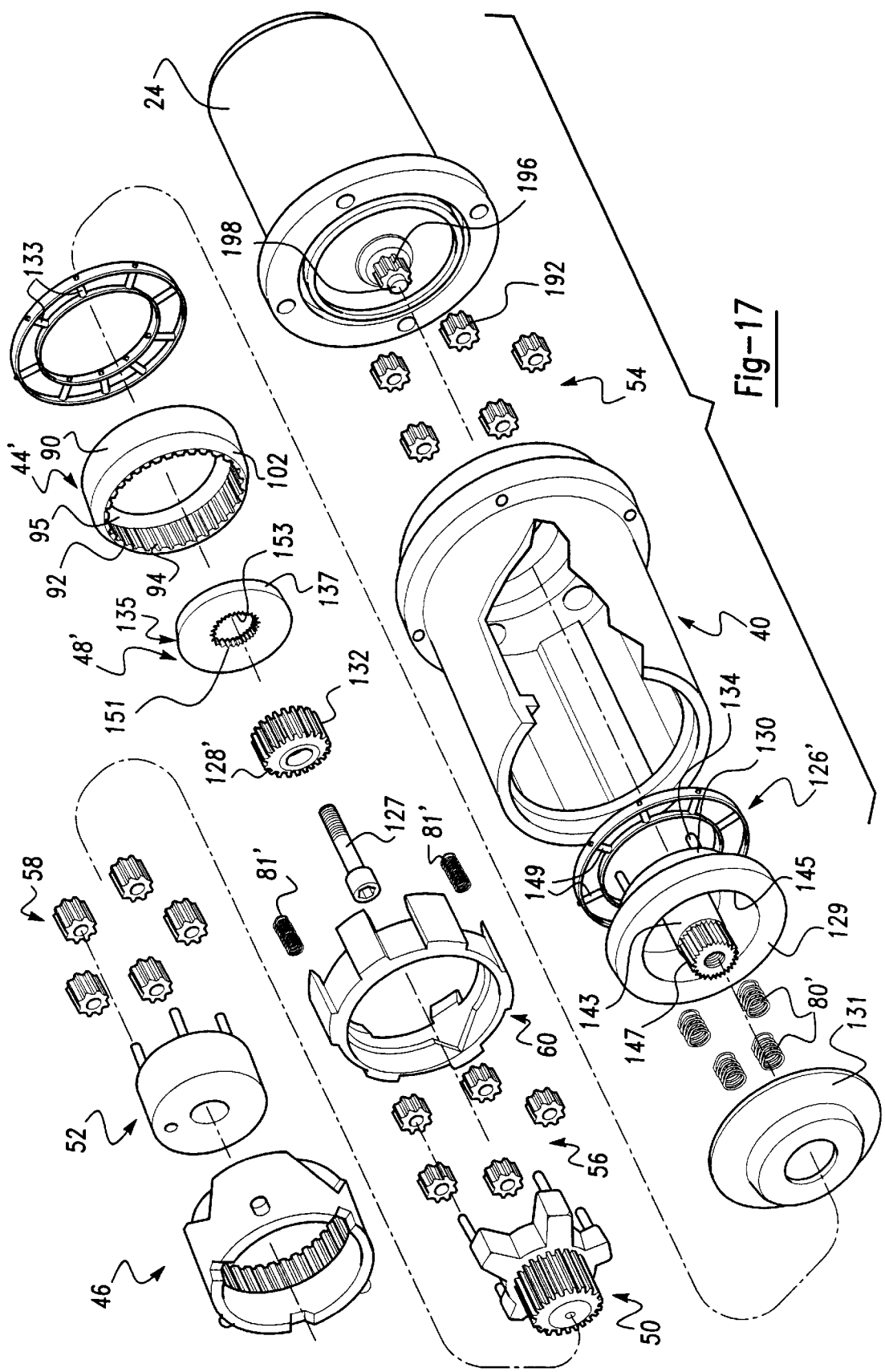
FIG. 17 is an exploded view like that of FIG. 16.

Moving to FIG. 17, a better view of the second reduction ring gear and the first reduction gear carrier is illustrated.

The second reduction ring gear 44' is an annular member having an exterior wall surface 90 and an interior wall surface 92. The interior wall surface 92 includes a plurality of teeth 94 and adjacent the teeth 94 is a conical ring 95. The exterior wall 90 of the second reduction ring gear includes a conical surface 102. The conical surface 102, as described herein, mates with the annular member 60 to axially move the second reduction ring gear 44' against the biasing springs 81' to enable the second reduction ring gear carrier to spin freely with respect to the first reduction ring carrier 48'. The teeth 94 and the second ring gear 44' mesh with the second set of planetary gears 56.

The first reduction carrier 48' includes a disc shaped body 126', a sun gear 128', a plurality of pin retaining members 130, and an annular member 135. The pin retaining members 130 and sun gear 128' are on opposite sides of the disc body 126' and the sun gear 128' and annular member 135 are retained on the body 126' via a fastener 127. The sun gear 128' has teeth 132 which mesh with the second set of planetary gears 56 and inner splines 129 which mate with the body 126'. The pin retaining members 130 include pins 134 which act as axles for the planet gears 54. The body 126' includes a ring 129 and a protecting cylinder 143 which define a cavity 145 which house springs 80' which bias a thrust plate 131 and thrust bearings 133 against the second reduction ring gear 44'. The protecting cylinder 143 includes spline 147 which mate with splines in the annular member 135 and sun gear 128'. Also, additional thrust bearings 149 are between the body 126' and the housing flange. The annular member 135 includes inner splines 151, in aperture 153, which mate with the protecting cylinder splines 147 and a conical outer surface 137 which mates with the conical surface 95 of the second reduction ring gear 44'. The conical surfaces lock the second reduction ring gear 44' with the first reduction ring gear 48' in a first position as seen in the upper half of the drawing in FIG. 16 and the transmission is in a high speed. Also, the bottom half of the drawing of FIG. 16 illustrates the disengagement of the two conical surfaces when the transmission is in a low speed.

Figure 4:
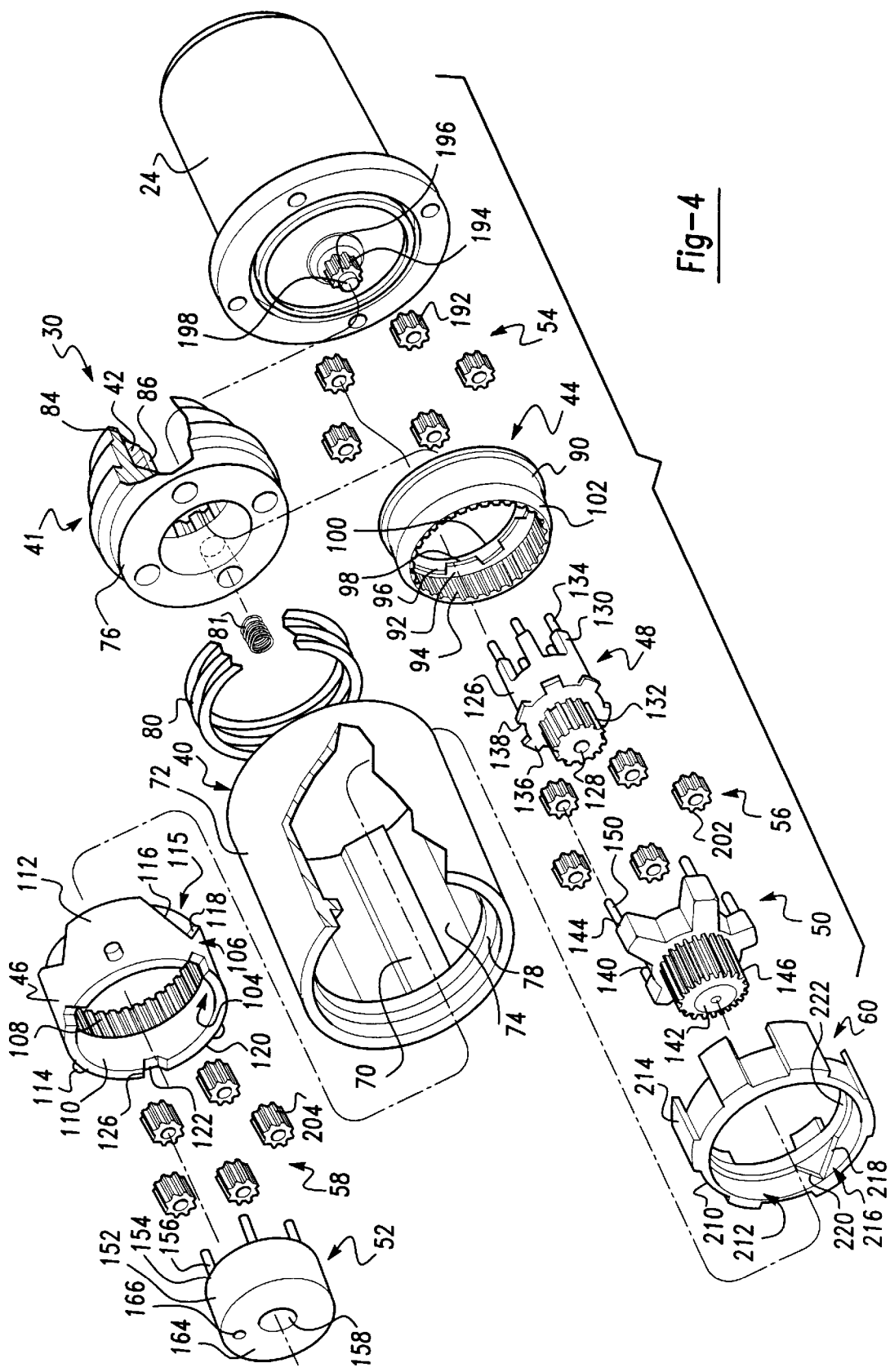
FIG. 4 is an exploded perspective view of the transmission of FIGS. 1–3.

The remainder of the transmission is substantially the same as that previously disclosed in FIGS. 2 through 4.

Figure 18:
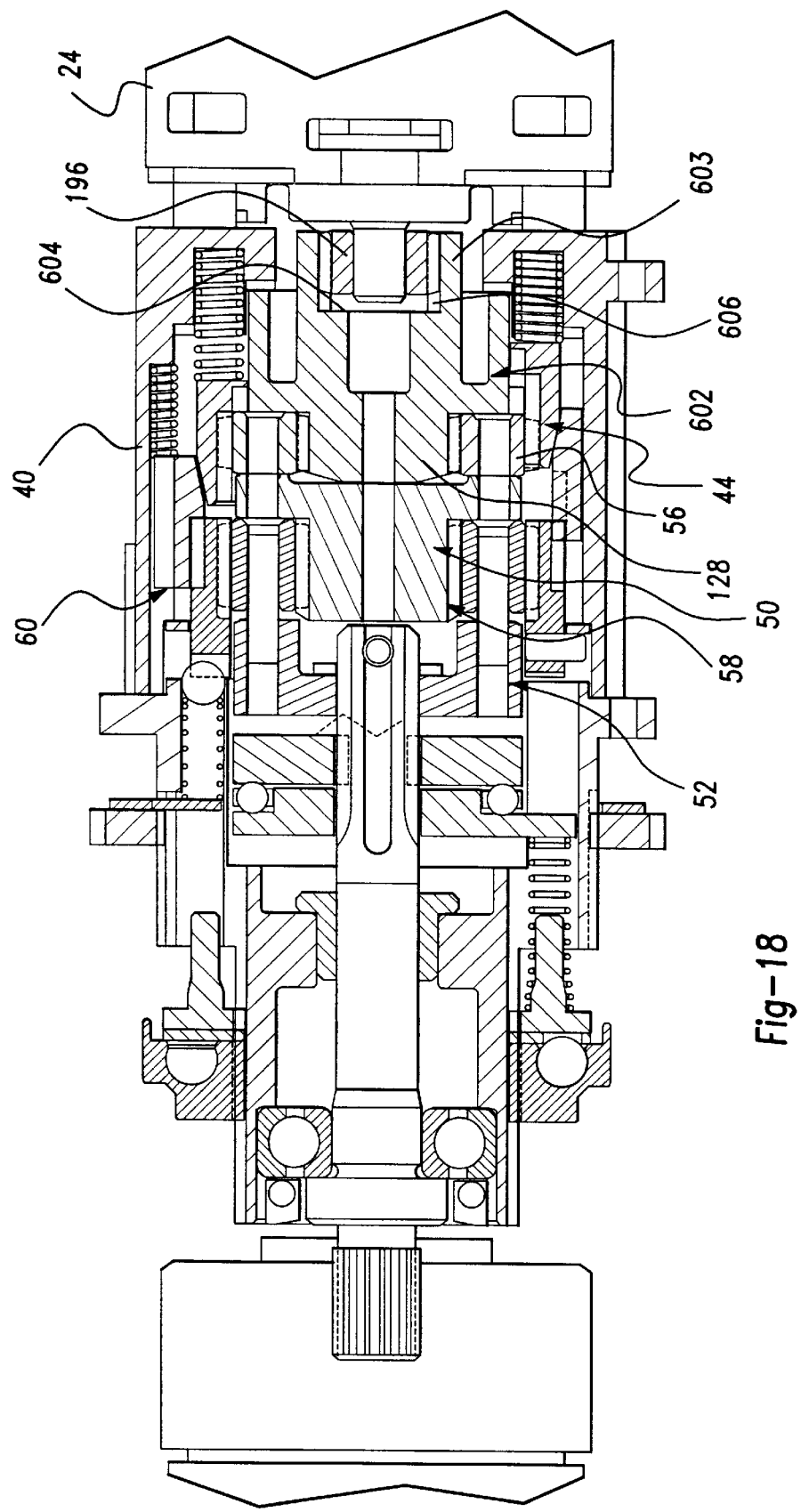
FIG. 18 is an additional embodiment of the transmission of the present invention.
Figure 19:
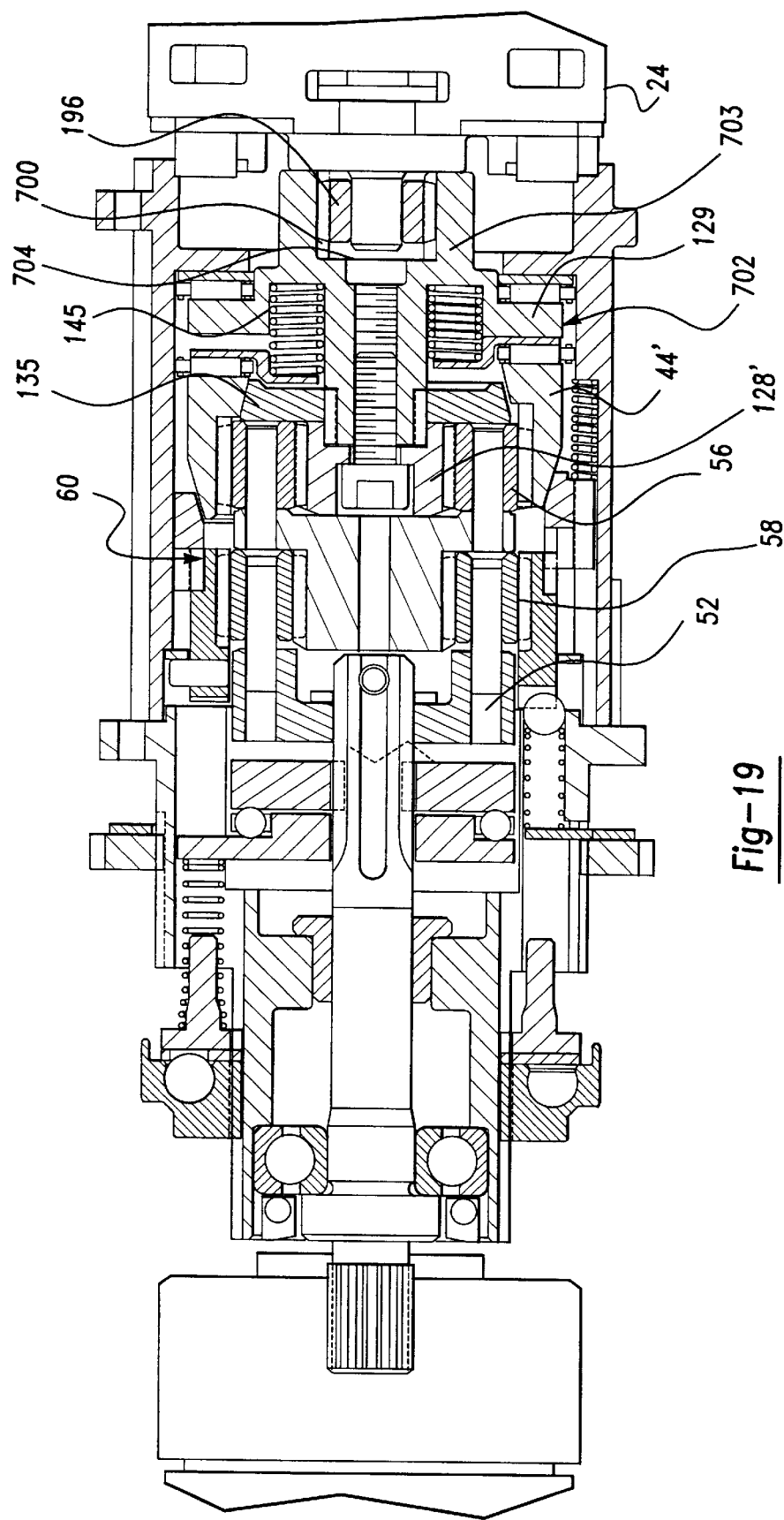
FIG. 19 is an additional embodiment of the transmission of the present invention.

Turning to FIGS. 18 and 19, additional embodiments of the invention is shown. Elements which have been previously described are identified with the same reference numerals.

FIG. 18 is a transmission like that in FIG. 2, however the first reduction ring carrier 602 has been modified and the first set of planetary gears and the first reduction ring gear has been eliminated. The first reduction ring carrier 602 has been modified to include a cylindrical member 603, a bore 604 which includes teeth 606 to mate with the drive pinion 196. The remainder of the transmission is like that previously disclosed in FIGS. 2 through 4.

FIG. 19 is a transmission like that of FIGS. 16 and 17 with the first reduction carrier 702 modified and the first set of planetary gears as well as the first reduction gear eliminated. Here, the first reduction ring carrier 702 has been modified to eliminate the pins and include a cylindrical member 703, a bore 704 with teeth 706 meshing with the motor pinion 196. The remaining elements are like those disclosed in FIGS. 16 and 17.

In the embodiments shown in FIGS. 18 and 19, the transmission moves from a high speed to a low speed. The first reduction ring carrier is driven directly by the pinion. The first reduction ring carrier, in turn, through the second reduction gear, drives the second reduction gear carrier which drives the set of the planetary gears and ultimately the output member as described herein. The second reduction ring gear disengages from the second set of planetary gears, moving to a low speed, as illustrated in the lower half of the drawings in FIGS. 18 and 19. The transmission shifts between high and low as described above with respect to the three reduction transmissions.

It will become apparent to those skilled in the art that various modifications and variations may be made in the power tool and automatic transmission of the present invention without departing from the scope or the spirit of the present invention. Thus, it is intended that the present invention cover these modifications and variations provided they come within the scope of the appended claims and their equivalents.

What is claimed is:

1. An automatic transmission for a power tool comprising:
    a transmission housing;
    a gear reduction mechanism positioned in said housing to be coupled with a motor;
    output means for rotating at a desired speed, said output means coupled with said gear reduction mechanism; and
    means for adjusting speed of said output means, said means for adjusting speed coupled with said gear reduction mechanism, said means for adjusting speed biased and coupled with said housing such that upon change in torque said means for adjusting speed moves in said housing moving said gear reduction mechanism for varying speeds of said output means.

2. The automatic transmission according to claim 1, and cam means for slidably moving said means for adjusting speed, said cam means coupled with said means for adjusting speed and said gear reduction mechanism.

3. The automatic transmission according to claim 1, wherein said means for adjusting speed comprising a clutch mechanism for engaging said gear reduction mechanism and an annular member having at least one projecting member on an exterior surface of said annular member for sliding in a groove in said housing.

4. The automatic transmission according to claim 3, wherein said annular member includes a conical surface on an inner surface for engaging said gear reduction mechanism.

5. The automatic transmission according to claim 4, wherein said annular member inner surface also includes at least one cam member for engaging said gear reduction mechanism.

6. The automatic transmission according to claim 5, wherein said conical surface and cam member are adjacent one another on the annular member inner surface.

7. The automatic transmission according to claim 5, wherein said gear reduction mechanism includes at least one cam surface on an exterior surface for engaging said cam member on said annular member.

8. The automatic transmission according to claim 7, wherein said at least one cam member and cam surface both are V-shaped.

9. The automatic transmission according to claim 7, wherein said gear reduction mechanism having an output face with at least one clutch pocket for coupling with said clutch mechanism.

10. The automatic transmission according to claim 9, wherein said clutch mechanism includes a clutch housing adjacent said transmission housing and at least one biased member removably coupled with said clutch pocket for adjusting speed of said output member between a first and second speed.

11. The automatic transmission according to claim 10, wherein said clutch mechanism includes biasing springs for biasing said member said biasing spring having desired characteristics.

12. The automatic transmission according to claim 1, further comprising a clutch mechanism associated with said output means for controlling rotation of said output means.

13. The automatic transmission according to claim 4, wherein said gear reduction mechanism including a corresponding conical face on an exterior surface for coupling with said conical face of said annular member.

14. The automatic transmission according to claim 3, wherein a biasing spring positioned in said housing for biasing said annular member in said housing.

15. A power tool comprising:
    a tool housing;
    a motor in said housing;
    a power source for energizing said motor;
    an output means coupled with said motor for moving at a desired speed; and
    an automatic transmission for coupling said motor with said output means;
    said automatic transmission including:
    a transmission housing;
    a gear reduction mechanism positioned in said housing and coupled with said output means;
    output spindle for rotating at a desired speed, said output spindle coupled with said gear reduction mechanism; and
    means for adjusting speed of said output means, said means for adjusting speed coupled with said gear reduction mechanism, said means for adjusting speed biased and coupled with said housing such that upon change in torque said means for adjusting speed moves in said housing moving said gear reduction mechanism for varying speeds of said output means.

16. The power tool according to claim 15, and cam means for slidably moving said means for adjusting speed, said cam means coupled with said means for adjusting speed and said gear reduction mechanism.

17. The power tool according to claim 15, wherein said means for adjusting speed comprising a clutch mechanism for engaging said gear reduction mechanism and an annular member having at least one projecting member on an exterior surface of said annular member for sliding in a groove in said housing.

18. The power tool according to claim 17, wherein said annular member includes a conical surface on an inner surface for engaging said gear reduction mechanism.

19. The power tool according to claim 18, wherein said annular member inner surface also includes at least one cam member for engaging said gear reduction mechanism.

20. The power tool according to claim 19, wherein said conical surface and cam member are adjacent one another on the annular member inner surface.

21. The power tool according to claim 19, wherein said gear reduction mechanism includes at least one cam surface on an exterior surface for engaging said cam member on said annular member.

22. The power tool according to claim 21, wherein said at least one cam member and cam surface both are V-shaped.

23. The power tool according to claim 21, wherein said gear reduction mechanism having an output face with at least one clutch pocket for coupling with said clutch mechanism.

24. The power tool according to claim 23, wherein said clutch mechanism includes a clutch housing adjacent said transmission housing and at least one biased member removably coupled with said clutch pocket for adjusting speed of said output member between a first and second speed.

25. The power tool according to claim 24, wherein said clutch mechanism includes biasing springs for biasing said member said biasing spring having desired characteristics.

26. The power tool according to claim 15, further comprising a clutch mechanism associated with said output means for controlling rotation of said output means.

27. The power tool according to claim 18, wherein said gear reduction mechanism including a corresponding conical face on an exterior surface for coupling with said conical face of said annular member.

28. The power tool according to claim 17, wherein a biasing spring positioned in said housing for biasing said annular member in said housing.

29. A power tool comprising:

a transmission housing;

a gear reduction mechanism positioned in said housing to be coupled with a motor, said gear reduction mechanism includes at least two reduction gears and two reduction gear carriers;

output means for rotating at a desired speed, said output means coupled with said gear reduction mechanism; and means for adjusting speed of said output means, said means for adjusting speed coupled with one of said gear reduction carriers or gears, said means for adjusting speed biased and coupled with said housing such that upon change in torque said means for adjusting speed moves in said housing connecting and disconnecting said mating surfaces;

said gear reduction mechanism includes at least two reduction gears and two reduction gear carriers, one of said reduction gear carriers including mating surfaces for connecting and disconnecting with one of said two reduction gears.

30. The power tool according to claim 29, wherein said mating surfaces being mating conical friction surfaces.

31. The power tool according to claim 29, wherein said reduction ring gear and reduction carrier each mating surface include three lugs and three recesses, said lugs and recess being of unequal size.

32. The power tool according to claim 29, wherein said reduction ring gear and reduction carrier each mating surface include a plurality of equally spaced lugs and recesses, said lugs including chamfered surfaces.

33. The power tool according to claim 29, wherein said reduction carrier includes a lug carrier ring and a clutch means for controlling rotation of said lug carrier ring.

34. The power tool according to claim 33, wherein said clutch means being a friction clutch comprising an annular conical member coupled with said lug carrier ring.

35. The power tool according to claim 29, wherein said reduction carrier includes means for synchronizing the speed of said reduction ring gear when said reduction ring gear upshifts between positions.

36. The power tool according to claim 35, wherein said means for synchronizing including an O-ring on said reduction carrier for contacting and imparting rotation on said reduction ring gear as said reduction ring gear passes over said O-ring during upshifting.

37. The power tool according to claim 35, wherein said means for synchronizing includes a plurality of lugs being radially displaceable in response to centrifugal force for contacting and imparting rotation of said reduction ring gear as said reduction ring gear passes over said lugs during upshifting.

38. The power tool according to claim 29, wherein said reduction carrier includes a plurality of radially displaceable members responsive to centrifugal force, said members including stop means for prohibiting upshifting of said reduction ring gear until a predetermined speed is accomplished wherein said reduction ring gear passes said stop means.

39. The power tool according to claim 29, wherein said reduction carrier and said reduction ring gear each mating surface include lugs and recesses being patterned such that said reduction carrier and said reduction ring gear are only engagable in a single orientation of said lugs and recesses pattern.

40. The power tool according to claim 39, wherein said reduction carrier includes a rotatable lug carrier ring.

41. The power tool according to claim 40, wherein said lug carrier ring includes a conical surface for contacting with a conical surface on said lugs of said second reduction ring gear for enhancing synchronization of said reduction ring gear during upshifting.

* * * * *